Aug. 12, 1941.   M. W. HOWARD   2,251,908
HEEL GRADING MACHINE
Filed Aug. 2, 1938   4 Sheets-Sheet 1

Inventor
Merton W. Howard
By Wright, Brown,
Quinby & May
Attorneys

Aug. 12, 1941.  M. W. HOWARD  2,251,908
HEEL GRADING MACHINE
Filed Aug. 2, 1938  4 Sheets-Sheet 2

Inventor
Merton W. Howard
By Wright, Brown,
Quinby + May
Attorneys.

Aug. 12, 1941. M. W. HOWARD 2,251,908
HEEL GRADING MACHINE
Filed Aug. 2, 1938 4 Sheets-Sheet 3

Inventor
Merton W. Howard
By Wright, Brown,
Quinby + May
Attorneys

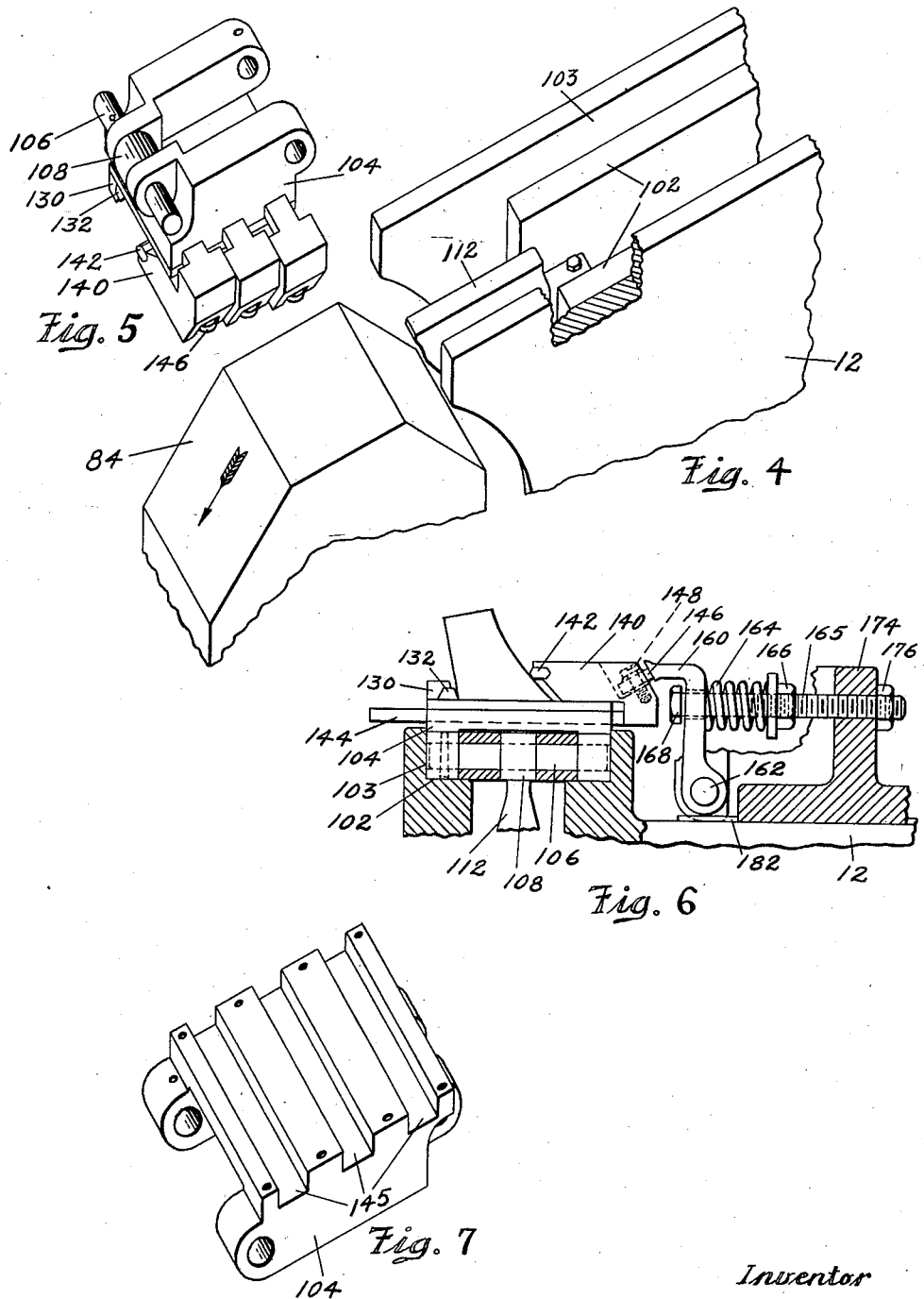

Patented Aug. 12, 1941

2,251,908

UNITED STATES PATENT OFFICE 2,251,908

HEEL GRADING MACHINE

Merton W. Howard, Haverhill, Mass., assignor to Pope Machinery Corporation, Haverhill, Mass., a corporation of Massachusetts Application August 2, 1938, Serial No. 222,678

30 Claims. (Cl. 12—42)

This invention relates to shoe heel grading machines.

In the manufacture of wood heels, the grooving and turning operations are performed while the seat and toplift end surfaces are in their original parallel planes, as in the blank. Usually the next operation consists of sawing off the toplift end of the turned heel at an angle relative to the seat surface, ranging ordinarily from 5° to 25°, in order that the heel may have the proper wedge to cause it to tread correctly on the finished shoe. This sawing operation is called "grading" in the trade and has heretofore been done on a simple hand machine consisting of a circular saw rotatable on a horizontal axis and a work carrier on an arm swingable on a parallel axis to bring the work against the edge of the saw. The usual motions of placing the work on the carrier and feeding it to the saw render both the operator and the work liable to injury since the fingers of the operator often move near to the saw edge and the rate of progress of the saw through the work is governed largely by the arbitrary feeding pressure exerted on the work by the operator. Excessive pressure is liable to make the saw chip the work as it emerges in completing the cut, thus spoiling the heel.

It is an object of the present invention to provide an automatic machine for grading heels in a much more rapid and efficient manner and with greatly lessened danger of injury to the operator's hands.

Continuous straight-line heel movement past the saw is arranged to avoid idle movement of the work-holders. With the object of limiting the production only by the operator's skill and speed, a work-holder has been devised which will accept and hold heels wherever and whenever the operator feeds them in, within the limits of a generous loading area, it being required only that the breast of the heel be positioned against a member which is in effect a continuous unbroken breast gauge or stop. Thus heels may be placed on the carrier in mutual contact or with random spacing between them.

A workholder of this type can be driven at a constant speed to grip the successive heels placed thereon and to move them past a stationary revolving saw. Since the heels can be presented to the saw with little or no gap between successive heels so that the saw cuts almost continuously instead of intermittently (as in the hand machine, the saw rotating idly after each heel is graded while the work carrier is moved back to loading position and is reloaded), the heels may be moved past the saw at a speed well under the maximum for proper cutting but fast enough to keep ahead of the operator loading heels thereon.

It is a further object of the invention to provide a work-holder which includes a substantially continuous platform of abutting sections carried by an endless carrier which passes around spaced wheels, the platform sections being so supported that no portion of any section will rise above the plane of the platform at any time in the operation of the work-holder. The sections of the work-holder are mounted on a plurality of articulated blocks adapted to engage and be driven by corresponding flats on a power-driven driving wheel, mated with an idler wheel of similar shape, these wheels being mounted at opposite ends of a horizontal table having guideways thereon so that the articulated work-holder travels along the top of the table in a straight line during which travel the heels are placed in the holder by the operator and are automatically graded.

The work holder includes also a continuous sectional breast or lip stop and a continuous sectional clamp jaw, sections of each of which are carried by the platform sections. The jaw closes on the heels as they approach the grading saw and grips them by their seat end portions between the clamp jaw and the breast stop, pressing the heels tightly against the top surface of the platform. When the heels have been graded, the jaws automatically open to permit them to fall by gravity into a container as the carrier turns down over the driving wheel. Both the closing and opening movements of the jaws are automatic and each heel is individually clamped, regardless of whether the heels are loaded on the carrier close together or spaced widely and irregularly apart as might be done by an operator while learning. By driving the work-holder only just fast enough so that the fastest operator is not quite able to load the heels in actual contact with each other, a cutting speed past the saw is had that is substantially slower than the average used by the old hand operators. This moderate cutting speed, which is about 15 feet per minute, results in improved sawed surfaces and less edge fracture on the heels while still providing opportunity for any operator to place heels on the platform as rapidly as he can handle them.

It is a further object of the invention to provide a grading machine which insures maximum safety to the operator. This is accomplished by providing loading space at a point remote from the saw and by suitable saw guards made possible by the structure of the machine.

The number and facility of adjustments constitute a major consideration in any extremely high production machine of the type illustrated. If 10 minutes are required to "set over" a machine when 5 minutes would have served, with better and/or fewer adjustments, a substantial difference of production per day or week results.

Essentially there are only two elements to be adjusted in any heel grading machine, namely, the work-holder and the saw. In the machine hereinafter described, a single adjustment, made without tools, serves to adapt the work-holder to any type or size of Louis or Cuban heel. The saw requires two adjustments regularly, and occasionally a third adjustment. The regular adjustments are for heel height and heel wedge and the occasional one is an adjustment crosswise of the work-holder path and in the plane of the saw blade to compensate for saw wear or to change the angle of the tangent of the initial saw contact on the heel relative to the work-holder path.

According to the present invention, a novel combination of adjusting devices is provided which is specifically designed for the most convenient and rapid handling of the necessary settings for the saw on an automatic grading machine. The details of the construction used will be more clearly shown and described in the drawings and accompanying description, but broadly it consists of a vertical support, perpendicular to the work-holder path, on which is mounted a pivoted plate for heel wedge, pivoting about an imaginary axis positioned at the front edge of the toplift surface of an average heel, another plate arranged for sliding adjustment on the pivoted plate for the above-mentioned occasional adjustment, and a third plate slidable on the second for the heel height adjustment.

The height of a heel is measured in inches and fractions thereof in a line perpendicular to the graded surface. I have arranged the direction of height adjustment so that a standard scale may be attached for record purposes and will read directly. That is, a ⅛ inch adjustment of the saw as shown on the scale will result in a ⅛ inch change in the heel height as understood and used by the trade.

The wedge of the heel is commonly defined as the angle of inclination between the plane of the heel seat and that of the toplift surface and is usually expressed in degrees. For this adjustment an easy-reading degree scale facilitates quick and accurate setting for the heel wedge. Both height and wedge readings may be readily recorded for future set-ups. The occasional third adjustment needs no recording because it has no effect on the height or wedge of the heel. For extreme facility, two bolts are provided which lock all three adjustments simultaneously and all adjustments are hand-crank operated. By slightly loosening the two bolts, any adjustment can be made a matter of seconds and the parts relocked.

These and other features of the invention will be more clearly understood from the following description of a preferred embodiment of the invention shown in the drawings in which—

Figure 4 is an isometric showing of details of the carrier block supporting ways at the driving sprocket end.

Figure 5 is an isometric view of the bottom of one of the carrier blocks.

Figure 6 is an enlarged view of one of the cushioned clamping pressure levers and associated apparatus clamping a heel.

Figure 7 is an isometric view of the top of one of the carrier blocks.

Figure 1:
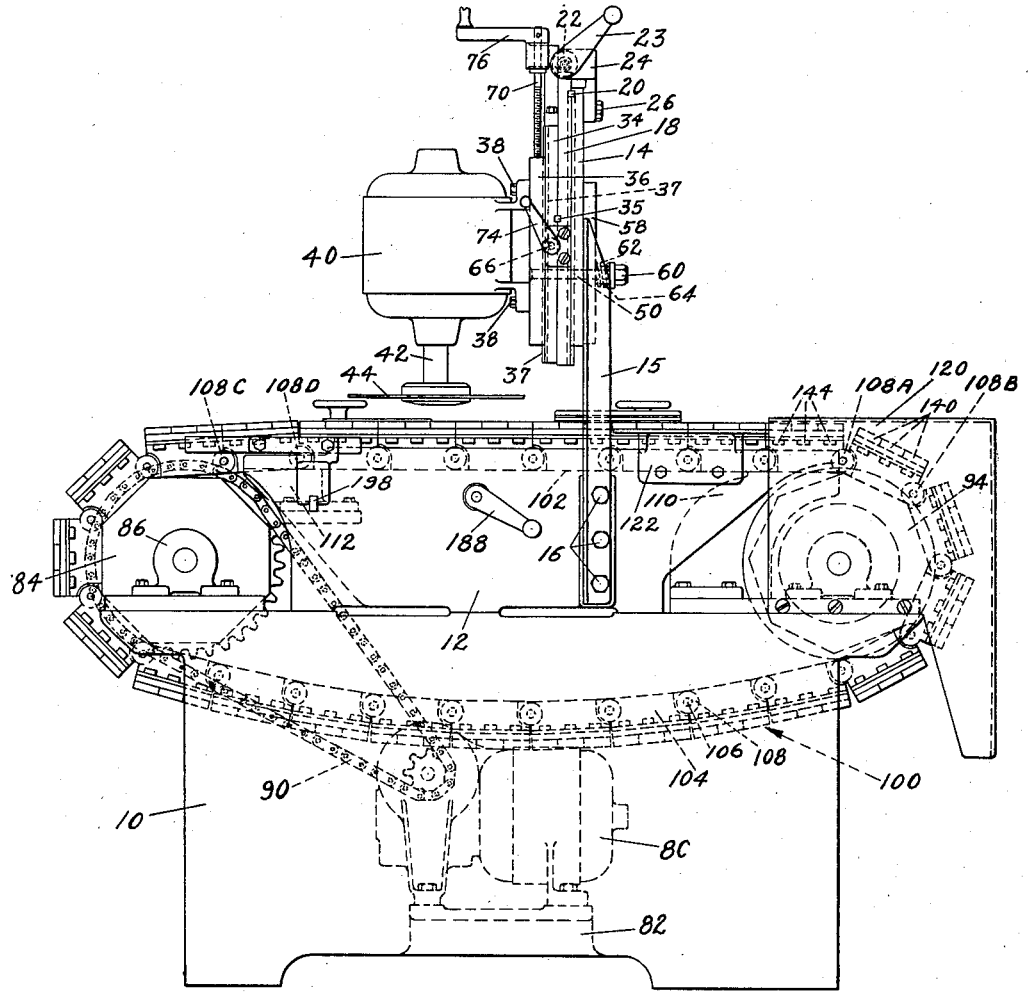
Figure 1 is a front elevation of a machine embodying the invention.

The grading machine illustrated on the drawings comprises a frame 10 which supports a table 12. Above the table is a tool support which consists of a number of relatively adjustable members including a vertical plate 14 supported by a pair of legs 15 which are secured to the sides of the table by bolts 16. Mounted on the tool support is a pivoted plate 18, guided for pivoted movement about a horizontal axis by a circular track 20 and actuated by a worm 22 rotatable by a hand crank or wheel 23 carried by a bracket 24 made fast to the plate 14 by bolts 26. The center of pivotal adjustment of the plate 18 is preferably located at the front edge of the toplift end of a heel of average height in position to be graded. Gear teeth 28 are cut in the arcuate edge of the pivoted plate 18 to engage the worm 22. Degree markings 30 on the plate 18 and an index mark 32 on the plate 14 provide means for recording settings of the plate 18. A plate 34 is mounted against the pivoted plate 18 and is adjustable approximately horizontally with reference thereto, being guided by a slightly inclined track or spline 35. A plate 36 is mounted against the plate 34 and is adjustable up and down, being guided by a track or spline 37 which is perpendicular to the track 35. Secured to the plate 36 by bolts 38 is an electric motor 40 having a shaft 42 on which is mounted a circular saw 44 which is a grading tool. The motor is arranged so that the axis of its shaft is parallel to the spline 37 and the plane of the saw 44 is parallel to the spline 35. Thus the saw may be adjusted axially by moving the plate 36 on the plate 34, or edgewise in its own plane by moving the plate 34 on the plate 18. For recording particular settings, a scale 46 and index 48 are provided to indicate axial adjustments, the scale being preferably graduated to read in 16ths of an inch.

Figure 2:
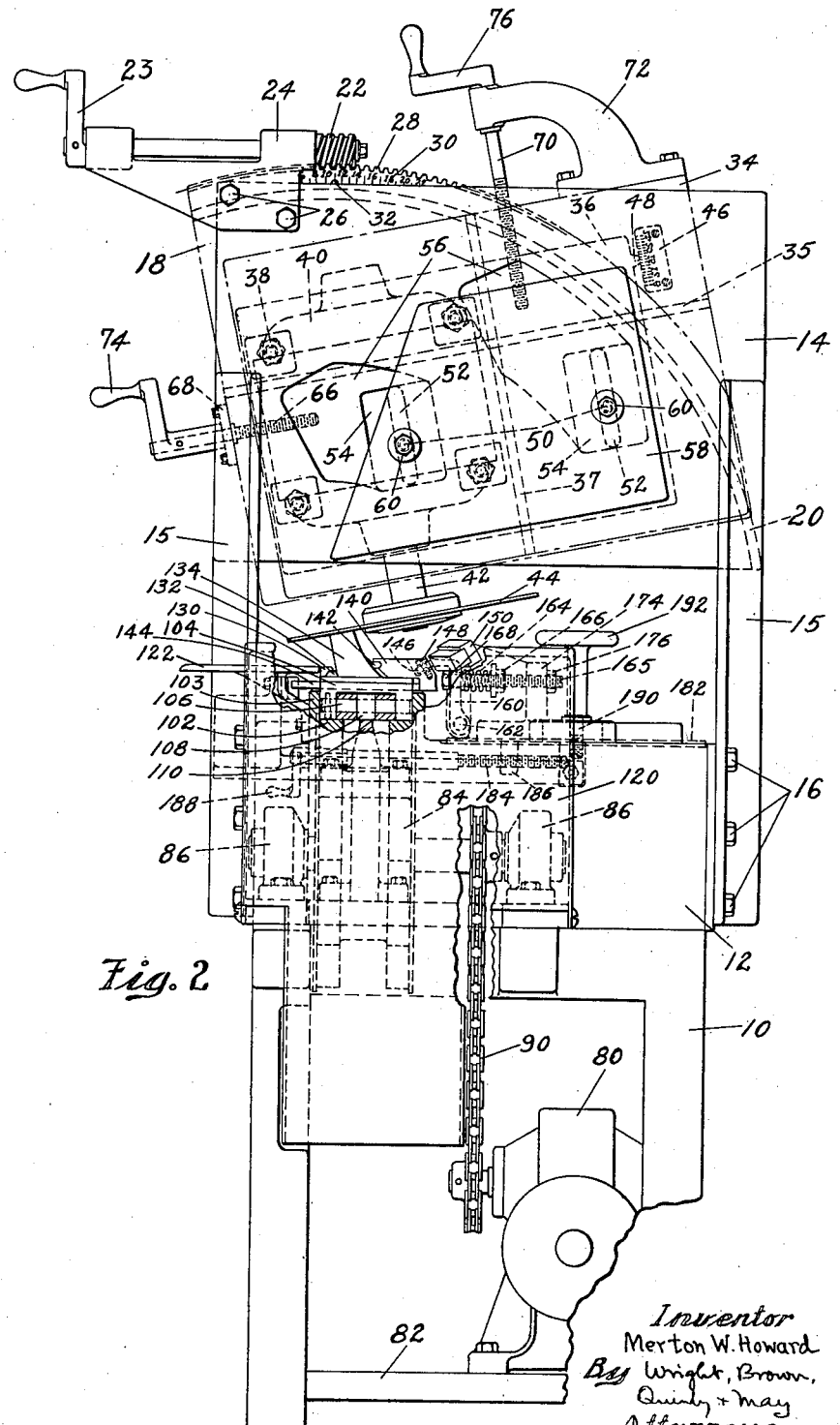
Figure 2 is an end view of the same, on a larger scale.

As indicated in Figures 1 and 2, the plates 36, 34, 18 and 14 are normally locked together by a pair of studs 50 which extend through slots 52 in the plate 34, rectangular openings 54 in the plate 18, arcuate openings 56 in the plate 14, and finally through holes in the cap-plate 58 which bears against the face of the plate 14 opposite to the plate 18 and bridges the openings in the plate 14. It will be noted that the slots 52 and openings 54 and 56 are so shaped, as indicated in Figure 2, that the studs 50 will not interfere with the adjustment of the respective plates.

The threaded ends of the studs 50 which project beyond the cap-plate 58 are supplied with nuts 60 which are set up to lock the plates in adjusted position. As it is desirable to have a frictional drag between the plates when released, a compression spring 62 and a spacing collar 64 are loosely mounted on each stud between the cap-plate 58 and the nut 60.

For controlling the adjustments of the plates, suitable slow-motion devices are provided. These comprise the worm 22 carried by the plate 14 and meshing with a worm gear sector 28 on the plate 18, a rotatable screw 66 carried by a bracket 68 on the plate 18 and threaded into the edge of the plate 34, and a screw 70 rotatably mounted on a bracket 72 on the plate 34 and screw-threaded into the edge of the plate 36. The screws 66 and 70 are provided respectively with operating means such as hand cranks 74 and 76. Thus any desired adjustment of the grading saw is quickly made by loosening the nuts 60, operating the crank 23 to adjust the inclination of the saw axis for the desired wedge angle, operating the crank 76 for axial adjustment of the saw according to the desired height of the heel, and, if desired, operating the crank 74 to shift the saw in its own plane for more favorable engagement with the heels to be graded.

A geared-head motor 80, bolted to a cross member 82 on the frame 10, drives a sprocket wheel 84 mounted for rotation in suitable bearings 86 on the frame 10 and connected to the motor by a chain 90. A mating idle sprocket wheel 94 is mounted in a similar manner to the opposite end of the frame 10, these two sprocket wheels acting to drive and partially support an endless articulated sectional carrier 100.

The upper stretch of the carrier 100 is guided and supported along the top of the table 12 for straight line travel in ways including a pair of rails 102 and lateral guides 103. As illustrated in the drawings, these supporting rails are shown in a horizontal position, but it is to be understood that this term is used for convenient description and not by way of limitation as the machine shown could obviously be operated in a tilted position. The carrier comprises a series of blocks 104 which are linked together by hinge pins 106 and abut one another in the upper stretch. The blocks have spaced longitudinal bearing surfaces along both sides and portions of the bottom to match corresponding surfaces on ways 102 and 103, the bottom being hollow to form a central channel between the bearing surfaces, as shown in Figure 5. On each of the pins 106 is a central roller 108 within the channel which serves as a bearing member for the block as it approaches one end of the rails 102 and as it leaves the other end of the rails. The rollers ride on short auxiliary rails 110 and 112 which are located midway between the rails 102 but extend a block's length beyond the ends of these rails, the central rail 110 being at the oncoming end of the ways and the rail 112 being at the off-going end. The purpose of this construction is to prevent any part of any block from rising above the level of the line-up of the blocks in the ways along the table top. Ordinarily, when an elongated body is pulled up over the edge of a horizontal supporting surface and onto the surface by a tensional drag, the leading end will be pulled up above the surface until the body rocks on the edge as a fulcrum, raising the following end of the body and lowering the leading end until they are at the same level upon the surface. Thus the leading end rises momentarily above its ultimate level. To avoid this undesirable result, the supporting means for the carrier blocks moving onto the table are arranged to support the leading end only until the following end has been elevated to the same level. Thus the block swings about its leading end instead of some intermediate point. The action of the carrier supporting means on approaching blocks can be seen in Figure 1, in which the carrier runs from right to left along the table top. A roller 108A has almost reached the highest point to which the sprocket wheel 94 can carry it, that is, on the level with the rollers of the blocks along the table top. At this point the roller 108A rolls onto the center support 110 which will then support the front end of the block following the roller 108A until the next following roller 108B has been raised by the sprocket wheel 94 to the table level, at which time said block will have been swung about the roller 108A into horizontal alinement with its predecessors along the table top, whereupon it is in proper alinement to ride upon the tracks 102 without any portion thereof having risen above the level of the block tops on the table.

On the off-going end of the table the parts are similar, but their arrangement and the resulting action differ somewhat from those at the oncoming end of the table due to the fact that the carrier is pulled along the table top by the power-driven sprocket wheel 84. The sprocket wheel 84 is on a level with the idle sprocket wheel 94, but it is somewhat more remote from the end of the ways 102 so as to prevent severe downward pressure on the center support 112 at certain stages in the rotation of the driving sprocket wheel 84. As seen in Figure 1, the roller 108C has recently rolled off the end of the center support 112 and is supported only by the tension on the adjacent blocks set up by the driving sprocket wheel 84. The rails 102 terminate at the point where the center support begins, considered in the direction of carrier travel. So, there being no block bottom support for the block between the rollers 108C and 108D, said block is free to swing about the axis of the roller 108D to aline itself with the tensional pull thereon by the driving sprocket wheel 84 without any portion of the block being levered up above the level of the following blocks.

The top faces of the blocks in the upper stretch of the carrier form in effect a continuous supporting surface for the work, extending longitudinally of the blocks. During the operation of the machine, this supporting surface moves successively through a loading zone in which heels are placed thereon, an operating zone in which the heels are graded by the saw 44, and a discharge zone in which the graded heels are discharged from the carrier. With the work-supporting surface which is substantially continuous through the loading, operating and discharge zones are sectional work-gripping elements 130 and 140 which are also substantially continuous through these zones and which are caused to converge to grip the heels on the carrier when passing from the loading zone to the operating zone, and to diverge to release the graded heels after passing through the operating zone. Heels to be graded may be placed at random at any point on this surface in the loading zone. Hence no regular spacing between successive heels is required.

A safety guard 120 is provided to protect the operator from injury from the closing gaps between the blocks as they come up around the idle sprocket wheel 94, and a loading platform 122 is mounted in front of the loading portion of the carrier to protect the operator and to assist him in loading heels onto the work carrier at the loading station adjacent to the platform 122. The upper stretch of the carrier extends past the plates which support the grading saw as well as past the saw itself. The use of the arcuate track 20 to guide the angular adjustive movements of the plate 18 on the plate 14 obviates the need of a pivotal connection between the plates at the axis of such adjustive movements. Hence, as shown in Figure 2, the adjustable supporting plates for the grading saw are located above the carrier a sufficient distance to be clear of the path of heels moving with the carrier from the loading station to the saw.

Figure 3:
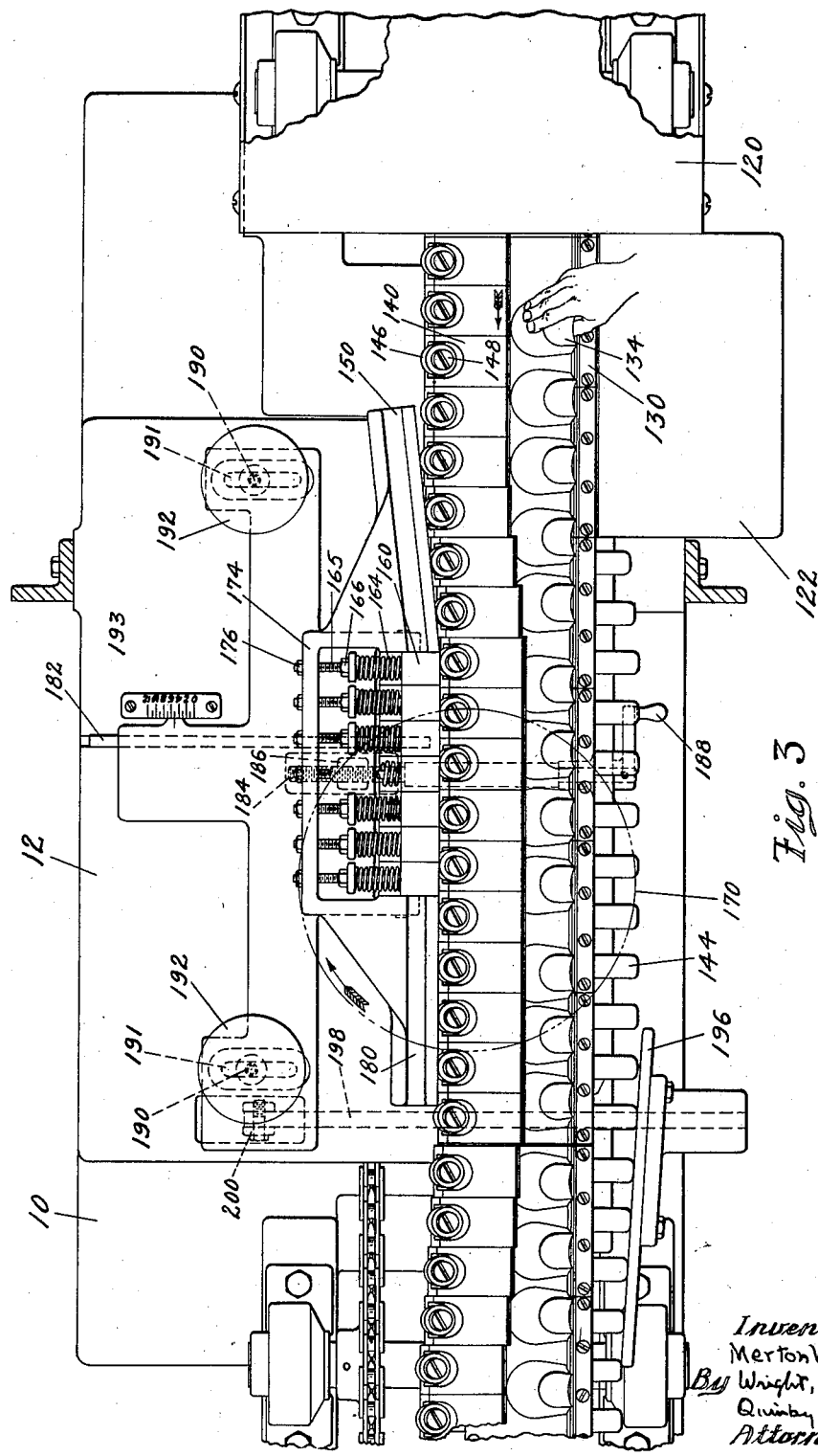
Figure 3 is a partial plan view showing the work holder.

Each block 104 in the endless carrier 100 is equipped with a fixed heel lip or breast stop segment 130 carrying a resilient strip 132 of rubber or the like to prevent damage to the heels 134, and a plurality of movable gripping elements such as jaw segments 140 each also carrying a resilient strip 142. The stop segments 130 in the blocks in the upper stretch of the carrier are alined and form a substantially continuous breast stop or abutment member against which the work may press. Each jaw segment 140 is mounted for sliding motion crosswise of the block on a slide bar 144 guided closely within slideways 145 within the block and below its top surface. Each jaw segment 140 is counterbored for a roller 146 mounted for rotation on a shoulder screw 148. A pre-clamping cam bar 150 faced with resilient material is engaged by successive rollers 146 and acts to close the movable gripping elements such as jaw segments 140 into contact with heels 134 loaded properly oriented, that is, with their breasts (in the case of Cuban heels) or their lips (in the case of Louis heels) squarely against the lip or breast stop 130, onto the carrier at the carrier at the loading station as the carrier moves constantly to the left as seen in Figure 3. The spacing between successive heels is entirely arbitrary as the heels are placed at any point whatever on the portion of the carrier passing the loading station, the only requirement being that they be inverted and properly oriented. As the heels move along from the loading station, they are first lightly clamped by the pre-clamping bar 150. The movable jaw rollers 146 are then carried past a series of cushioned pressure levers 160 pivoted on a common shaft 162. Compression springs 164 are supported by bolts 165 and are pre-loaded by nuts 166 to produce a predetermined cushioned pressure against the pressure levers 160 to hold them against bolt heads 168 until moved slightly away from said bolt heads by jaw segments 140 which are in engagement with heels on the carrier, as shown in Figure 6. The resultant spring pressure causes the movable jaw segments to clamp the heels firmly by the seat end portion only thereof while they are being graded by the saw 44, the position of which is indicated in Figure 3 by the outline of its cutting edge 170. This leaves the toplift end portion of the heels free and clear, as shown in Figure 6, for unobstructed operation thereon by the grading saw 44.

The bolts 165 which carry the pressure springs 164 are threaded into a clamp frame 174 and locked in adjusted position by lock nuts 176. A post-clamping bar 180, preferably faced with a resilient material, such as rubber, acts to keep the graded heel lightly clamped, after leaving the cutting area, until entirely clear of the saw.

A cam bar 196 is provided to open the heel clamps after they have moved past the bar 180 to release the heels for free discharge from the carrier. The bar 196 is arranged at an angle to the direction of progress of the blocks 104 and is engaged by the ends of successive slide bars 144 to push the jaw segments 140 back from the lip or breast stop 130 after the clamps have left the grading area. Since the spacing and relationships between the bars 150, 180 and 196 should be maintained constant, these bars are connected together so that all of them move as a unit when adjustments are being made. To this end the pre-clamping, clamping, post-clamping and clamp-opening mechanisms are all carried by the clamp frame 174 as a unit and are adjustable therewith transversely of the work carrier on the table 12 under guidance of a key 182 by means of a screw 184 collared in the table 12 against axial movement. The screw 184 is threaded through a boss 186 which projects down through the table 12 from the clamp frame 174 and is actuable by a handle 188. The clamp frame 174 is lockable in its adjusted position by suitable clamping bolts 190 extending through slots 191 in the frame 174 and threaded into the table 12. These bolts may be operated by any convenient means such as hand-wheels 192. The cam bar 196 is connected to the frame 174 by a link 198, one end of which is secured to a boss 200 projecting down from the frame. A suitable scale 193 and index may be provided to identify any particular adjustment of the frame 174, so that, when the frame has once been properly adjusted for grading a certain style and size of heel, a record can be made of the scale reading so that the frame can later be quickly and accurately reset if another lot of heels of the same style and size are to be graded.

In operation, if the heels to be graded are of a regular style similar to heels previously graded on the machine, the single work-holder adjustment and the two active saw adjustments are set by record, using the scales 193, 46 and 30, and the machine is ready to operate. If a new style is to be graded, a heel is placed in the work holder between the breast stop 130 and one of the jaw segments 140 which is in line with a pressure lever 160. The frame 174 is then moved forward by manipulation of the crank 188 until said pressure lever is rocked slightly away from contact with the corresponding bolt head 168, as shown in Figure 6, so that this jaw segment is acted upon by the force of the spring 164. The carrier is then ready to clamp heels properly for grading. The wedge angle of the heel, which will be known either from the work tag or from a sample graded heel, will be set in degrees according to scale 30, but the height must be secured by experiment either by moving a sample graded heel, if at hand, under the saw 60 and then adjusting said saw by manipulation of the handle 76 to bring the saw just into contact with the top of the sample heel, or, if a certain height is specified but no sample is available, the saw is set high, an experimental cut made, and then a correct height adjustment made by the aid of scale 46, the divisions of which are spaced apart by 16ths of an inch, the customary unit for measuring heel heights, and correspond to 16ths of an inch differences in the actual heights of the graded heels. Heel heights are measured on perpendiculars to the toplift face of the graded heel, this face being produced by the grading saw. It is for this reason that the saw is adjusted in the direction of its axis for different heel heights.

Figure 8:
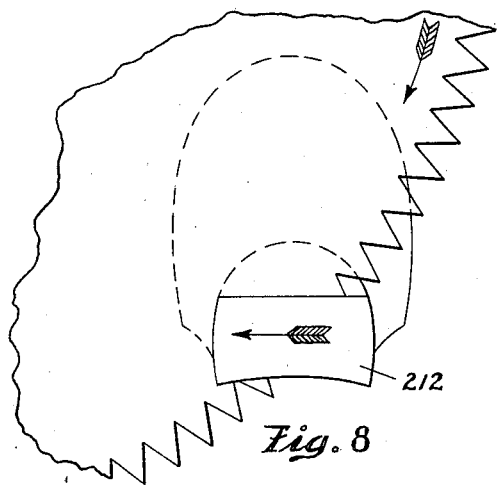
Figure 8 is a fragmentary plan view of a grading saw cutting through a heel.

The proper kind of grading cut is illustrated in Figure 8. The actual chip 212 is a wedge-shaped piece if the heel blank has been correctly cut to minimize waste of material. Having secured the proper grade in height and wedge, records of these settings together with the workholder setting may be made on suitable cards for future set-ups of the same style without experiment. When adjustments have been made for the grading of a batch of heels, the motors 40 and 80 are started, whereupon heels may be loaded onto the work carrier with random spacing between successive heels as shown in Figure 3, it being necessary only to see that the toplift end of the heel is uppermost and that the breast of the heel is squarely against the breast stop 130. The heels are carried along by the carrier 100 and are automatically graded by the saw 44, after which the movable clamping jaw will be automatically opened by the cam 196 and the graded heels discharged by gravity as the endless carrier turns downward over the driving sprocket wheel 84 at the left side of the machine as seen in Figure 1.

The arrangement of the various adjustments is such as to provide maximum economy of time required for accurate adjustment. The adjustment of the saw blade in its own plane can be made at any time without affecting the location of the cuts on heels. No scale is used here as the setting is not critical and is infrequently made. When it is made, its object is to compensate for reduction in saw diameter as a result of wear or to cause the teeth of the saw to cut across the heel top at some preferred angle, such as shown in Figure 8, in which the teeth cut across the top at an angle of about 45° to the direction of movement of the heel. The three regularly used adjustments, however, are all fitted with scales, and their direction and manner of adjustment are specially designed for best results on this particular machine and purpose. The pivotal movement pivots around an imaginary axis positioned relative to an average heel so that a minimum effect on the height of the heel will result from an angular change.

It is evident that various modifications and changes may be made in the particular form of invention herein shown and described without departing from the spirit and scope of the invention as defined in the following claims.

I claim:

1. In a wood heel making machine, a tool, an endless carrier movable past said tool, said machine having a loading station on one side of said tool and a discharge station on the other, and means carried by said carrier for clamping thereon heels placed thereon at any point along the portion thereof passing the loading station.

2. In a wood heel making machine, a tool, an endless carrier movable past said tool, means on said carrier for clamping thereon heels placed thereon with random spacing for passage past said tool, means for automatically moving successive portions of said clamping means into clamping position as they approach said tool, and means for automatically moving said portions to releasing position as they recede from said tool.

3. A machine of the class described, comprising a stationary tool, an endless work carrier having a stretch extending past said tool on which work may be carried, means for driving said carrier, and means on said carrier for clamping the work placed on said carrier at any random points along the portion of said stretch approaching said tool.

4. In a machine of the class described, a stationary tool, an endless work carrier movable past said tool, clamping means carried by said carrier for gripping work placed on said carrier at any random points along the portion of said carrier approaching said tool, and means for automatically operating said clamping means to grip the work on the carrier as it reaches a certain point in its approach to the tool and as it passes the tool and to release the work after it has passed the tool.

5. A heel grading machine comprising a stationary saw, an endless work carrier movable past said saw, clamping means on said carrier for gripping heels placed with random spacing along the portion of said carrier approaching the saw, means for driving said carrier, and means for automatically operating said clamping means to grip heels on the carrier when they reach a certain point in their approach to said saw and to release heels on the carrier after they have passed the saw.

6. In a wood heel making machine, a tool, an endless carrier having a straight stretch adjacent to said tool, said carrier comprising a series of flat-topped blocks forming a substantially continuous surface in said straight stretch, means on said carrier for clamping heels placed at any point on a substantial portion of said carrier approaching said tool, means for automatically operating said clamping means to grip the heels placed thereon as they pass the tool and to release the heels thereafter.

7. In a machine of the class described, an endless work carrier including a series of blocks linked together, said carrier having a straight stretch wherein the blocks form a substantially continuous work-supporting surface, clamping means on said blocks for gripping work placed at random on said surface, said clamping means including alined stationary elements forming a substantially continuous abutment and elements movable toward said abutment to grip the work, and means for automatically actuating said movable elements to grip and release work on said surface as it passes predetermined points.

8. In a machine of the class described, an endless work carrier including a series of blocks linked together, a pair of spaced wheels about which said carrier passes, a horizontal supporting member for said carrier between said wheels, and means including auxiliary supports at the ends of said supporting member for causing said blocks to move onto and off from said supporting member without projecting above the level of the blocks upon said supporting member.

9. In a machine of the class described, an endless carrier including a series of blocks linked together at their ends, each block having on its bottom a pair of spaced longitudinal bearing surfaces with a channel between and a bearing element at each end of each block within said channel, and means for supporting a stretch of said carrier, said means including trackways to receive the said bearing surfaces of successive blocks and auxiliary ways extending approximately a block's length beyond the ends of said trackways to receive said bearing elements.

10. In a heel grading machine, an endless work carrier comprising a series of blocks linked together, a pair of spaced wheels for driving and partially supporting said carrier, a table supporting the upper stretch of said carrier between said wheels, clamping mechanism including alined stop elements secured to said blocks and forming a substantially continuous abutment member on said upper stretch of the carrier and a plurality of gripping elements on each block movable crosswise of the block to grip heels placed at random at any point along the top of the block, a cam member engageable by successive gripping elements to move said elements into engagement with heels on the blocks, spring-loaded pressing elements engageable by said gripping elements to press said elements firmly against said heels, and means for retracting said gripping elements after they have passed the pressing elements to release the heels gripped thereby.

11. In a heel grading machine, an endless work carrier comprising a series of blocks linked together, a pair of spaced wheels for driving and partially supporting said carrier, a table supporting the upper stretch of said carrier between said wheels, clamping mechanism including alined stop elements secured to said blocks and forming a substantially continuous abutment member on said upper stretch of the carrier and a plurality of gripping elements on each block movable crosswise of the block to grip heels placed at random at any point along the top of the block, a cam member engageable by successive gripping elements to move said elements into engagement with heels on the blocks, spring-loaded pressing elements engageable by said gripping elements to press said elements firmly against said heels, means for retracting said gripping elements, and means for simultaneously adjusting said cam member, pressing elements and retracting means as a unit for operation on heels of a different size.

12. In a heel grading machine, an endless work carrier, a grading saw mounted adjacent to said carrier, a supporting plate for said saw, means for adjusting said saw in the direction of its axis relatively to said plate, means for adjustably turning said plate in its own plane to change the angle in inclination of said axis, means for adjusting said saw edgewise in its own plane without disturbing any other adjustments thereof, and means for securing said saw and plate in adjusted position.

13. In a heel grading machine, a grading saw, supporting means therefor including a series of relatively movable members, means for releasably securing said members together, and slow-motion means for causing adjusting movements between said members when released to move the saw in its own plane without disturbing any other adjustments of said saw, to move the saw in the direction of its axis, and to change the angle of inclination of said axis.

14. In a heel grading machine having a stationary tool and a work carrier adapted to convey heels past said tool, adjustable means for supporting said tool, said means comprising a fixed plate, a plurality of plates in successive face to face engagement on one side of said fixed plate, each of said plurality of plates being adjustable in its own plane relatively to said fixed plate, a cap plate on the other side of said fixed plate, a pair of bolts passing through all of said plates, securing means on said bolt for clamping said plates tightly together, and springs on said bolts for maintaining frictional engagement between said plates when the securing means are released.

15. In a heel grading machine having a stationary rotatable saw and a work carrier adapted to convey heels past said saw, adjustable means for supporting said saw comprising a fixed vertical plate, a series of three plates in successive face to face engagement on one side of said fixed plate, said three plates being respectively adjustable in their own planes relatively to the fixed plate in a direction parallel to the axis of said saw, in a direction parallel to the plane of said saw, and angularly about an axis approximately in the plane of the saw, a cap plate on the other side of said fixed plate, and means for clamping all of said plates tightly thereon.

16. In a machine of the class described, a stationary tool, an endless work carrier movable past said tool, clamping means on said carrier for gripping a succession of similar objects placed with random spacing along the portion of the carrier approaching the tool, means for driving the carrier, and means for automatically operating said clamping means to grip said objects on the carrier when they reach a certain point in their approach to the tool and to release said objects on the carrier after they have passed the tool.

17. In a heel grading machine, an endless work carrier comprising a series of blocks linked together, a pair of spaced wheels for driving and partially supporting said carrier, a table supporting the upper stretch of said carrier between said wheels, clamping mechanism including alined stop elements secured to said blocks and forming a substantially continuous abutment member on said upper stretch of the carrier and a plurality of gripping elements on each block movable crosswise of the block to grip heels placed at random at any point along the top of the block, a cam member engageable by successive gripping elements to move said elements into engagement with heels on the blocks, spring-loaded pressing elements engageable by said gripping elements to press said elements firmly against said heels, and means for simultaneously adjusting said cam member and pressing elements as a unit for operation on heels of a different size.

18. A heel grading machine comprising a stationary saw, an endless work carrier movable past said saw, clamping means on said carrier for gripping the seat end portions only of heels placed close together along the portion of the carrier approaching the saw, and means for automatically operating said clamping means to grip heels on the carrier when they reach a certain point in their approach to the saw and to release heels on the carrier which have passed the saw.

19. A heel grading machine comprising a tool, an endless flexible carrier movable past said tool, means on said carrier for gripping closely spaced heels thereon by their seat end portion only when approaching said tool and releasing said heels after they have passed the tool, and means for operating said gripping means at predetermined points in their travel.

20. A heel grading machine comprising a tool, an endless carrier having a straight stretch adjacent to said tool, said carrier comprising a series of flat-topped blocks forming a substantially continuous surface in said straight stretch, said machine having loading and discharge stations on opposite sides of said tool, means on said carrier for gripping by the seat end portion only heels placed close together on said carrier at said loading station, and means for operating said gripping means at a predetermined point as they approach said tool 21. A heel grading machine comprising a stationary rotatable tool, a flexible endless conveyor having a portion adapted to carry heels past said tool in operative relation thereto, means for gripping the heels by the seat end portion only, said means including clamping elements on said conveyor having relative movements toward and away from each other in a direction transverse with respect to the direction of travel thereof with the conveyor, and means for actuating said clamping elements to clamping position as they reach a predetermined point in their approach to the tool.

22. A heel grading machine comprising a rotatable tool, an endless articulated sectional carrier adapted to carry heels past said tool in operative relation thereto, means for gripping the heels by the seat end portion only on said carrier as they approach said tool, said gripping means comprising elements having gripping and releasing movements relative to each other in a direction transverse with respect to the direction of travel of the adjacent portion of the carrier, and means for moving said elements to gripping relation when they reach a predetermined point in their approach to the tool.

23. In a machine of the class described, a stationary tool, an endless work carrier movable past said tool, clamping means carried by said carrier for gripping work placed on said carrier at any random points along the portion of said carrier approaching said tool, and means automatically operating said clamping means to grip the work on the carrier as it reaches a certain point in its approach to the tool and as it passes the tool.

24. A heel grading machine comprising a stationary saw, an endless work carrier movable past said saw, clamping means for gripping by their seat end portions heels placed with random spacing along the portion of said carriage approaching the saw, means for driving the carrier, and means for automatically operating said clamping means to grip the heels on the carrier when they reach a certain point in their approach to the saw.

25. In a machine of the class described, an endless work carrier including a series of blocks linked together, a pair of spaced wheels about which said carrier passes, a horizontal supporting member for said carrier between the wheels, and means including an auxiliary support at an end of said supporting member for causing said blocks as they pass said end of the supporting member to do so without projecting above the level of the blocks on the supporting member.

26. In a machine of the class described, an endless work carrier including a series of blocks linked together, a pair of spaced wheels about which said carrier passes, a horizontal supporting member for said carrier between the wheels, and means including an auxiliary support at the discharge end of said supporting member for causing said blocks as they pass from the supporting member to the wheel at the discharge end of the supporting member to do so without projecting above the level of the blocks on the supporting member.

27. In a heel-making machine, means for conveying the work from a loading zone through an operating zone, said means having work-supporting and work-gripping elements which are substantially continuous through said zones, whereby the work may be loaded on said means with successive pieces of work in mutual contact.

28. In a heel-making machine, means for conveying the work from a loading zone through an operating zone, said means having work-supporting and work-gripping elements which are substantially continuous through said zones, and means automatically maintaining said elements in work-gripping relation within said operating zone.

29. In a heel-making machine, means for conveying the work from a loading zone through an operating zone, said means including work-supporting and work-gripping elements which are substantially continuous through said zones, and means for causing said work-gripping elements to converge to grip the work when passing from the loading zone to the operating zone.

30. In a heel-making machine, means for conveying the work from a loading zone through an operating zone, said means including work-supporting and work-gripping elements which are substantially continuous through said zones, means for causing said work-gripping elements to converge to grip the work when passing from the loading zone to the operating zone, and preloaded spring means opposing divergence of said work-gripping means within the operating zone.

MERTON W. HOWARD.